March 3, 1970    H. J. BALHOUSE    3,498,582
CARTRIDGE BALL VALVE

Filed Sept. 12, 1967    3 Sheets-Sheet 1

INVENTOR.
HAROLD J. BALHOUSE
BY Herman Foster
ATTORNEY

March 3, 1970     H. J. BALHOUSE     3,498,582
CARTRIDGE BALL VALVE

Filed Sept. 12, 1967     3 Sheets-Sheet 3

INVENTOR.
HAROLD J. BALHOUSE
BY Herman Foster
ATTORNEY

United States Patent Office 3,498,582
Patented Mar. 3, 1970

3,498,582
CARTRIDGE BALL VALVE
Harold J. Balhouse, East Greenwich, R.I., assignor to Grinnell Corporation, Providence, R.I., a corporation of Delaware
Filed Sept. 12, 1967, Ser. No. 667,276
Int. Cl. F16k 51/00, 5/00
U.S. Cl. 251—151                               5 Claims

ABSTRACT OF THE DISCLOSURE

A ball valve with a central, removable, integral cartridge section containing the ball member. The ball is rotatably retained and sealed in place within the casing of the cartridge by an elastomer filler or core which is molded in place between the casing and ball. The cartridge has axially extending sealing lips which are compressed in sealing relation as the cartridge is held between opposed spaced flanged socket members by a plurality of parallel body screws axially oriented and passing externally of the cartridge from flange to flange of the spaced socket members.

BACKGROUND OF THE INVENTION

This invention relates to the type of rotary plug stop valve known as a ball valve. More particularly it deals with a ball valve in which the ball is contained within an easily removable and replaceable cartridge portion. This cartridge portion contains an elastomer filler which simultaneously acts as the retaining and sealing means for the ball. The filler is preferably injection, transfer, or compression molded in place so that no other mechanical retaining means for the ball are necessary.

While in the past there have been ball valve constructions wherein the balls and sealing means may be considered as cartridges and removed as single units, these valves have generally had top loading unitary bodies into which the ball and its elastomer retaining envelope was stuffed. U.S. Patents Nos. 3,110,501, and 3,192,943 respectively issued to Hansen et al. and Moen are illustrative of such valves. These valves, however, by comparison to the present invention, are more expensive to manufacture and assemble. Moreover, because of dimensioning problems it is difficult to control the correct amount of retaining pressure which will be imposed on the elastomer envelope by the valve top works when the latter is replaced. Further, because it is occasionally desirable to have removable sections in a pipeline, when the top loading variety of ball valve, referred to above, is used, additional pipe unions are required to be placed in the pipeline near some of the valves.

SUMMARY OF THE INVENTION

The invention concerns a ball type valve which includes features that overcome the above stated difficulties.

An object of the invention is to provide a ball type valve assembly including a replaceable cartridge insert which provides both seating and sealing for the ball unit in the cartridge.

Another object of the invention is to provide a ball type valve assembly including a replaceable cartridge insert which contains a unitary molded elastomer filling for retaining and sealing the ball unit of the valve.

A further object of the invention is to provide a ball type valve assembly in which the casing of the replaceable cartridge insert is also part of the original mold in which the elastomer filling is formed.

Still another object of the invention is to provide a ball type valve assembly with a replaceable cartridge insert in which the elastomer filling has lips or ridges as its axial spaced ends extending beyond the ends of the cartridge casing to act as sealing means with the pipe connecting ends of the valve.

Still a further object is to provide a ball type valve assembly with a replaceable cartridge insert in which the casing of the cartridge acts as a stop to prevent overstressing of the cartridge end sealing means.

Yet a further object is to provide a ball type valve assembly with a replaceable cartridge insert in which the valve acts as a pipe union by removal of the insert thus eliminating the need for many additional unions in the pipeline.

Other objects and advantages will become apparent from the following description and drawing.

DESCRIPTION OF THE PREFERRED EMBODIMENT

Figure 1:
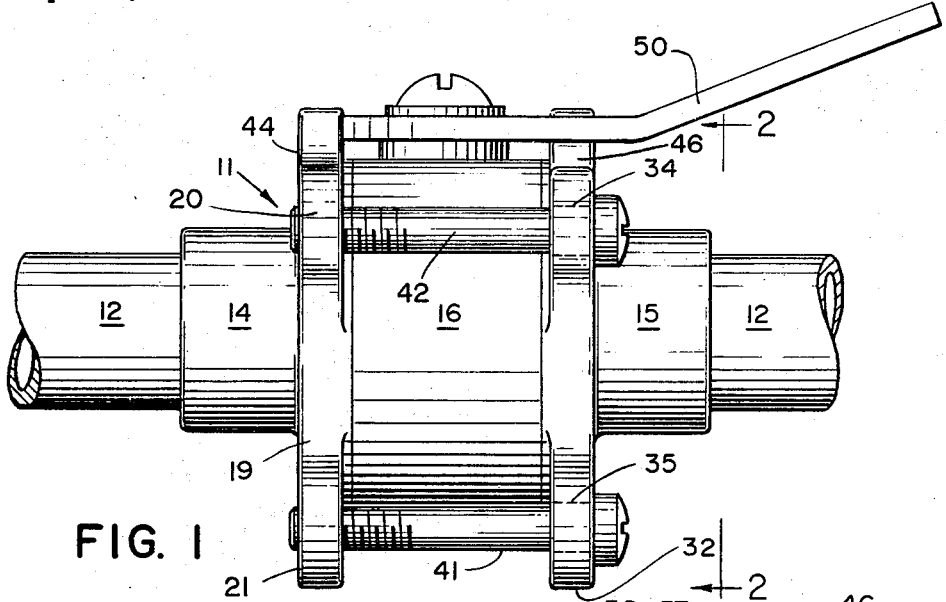
FIG. 1 is a side elevation view of the ball valve incorporating the present invention.
Figure 2:
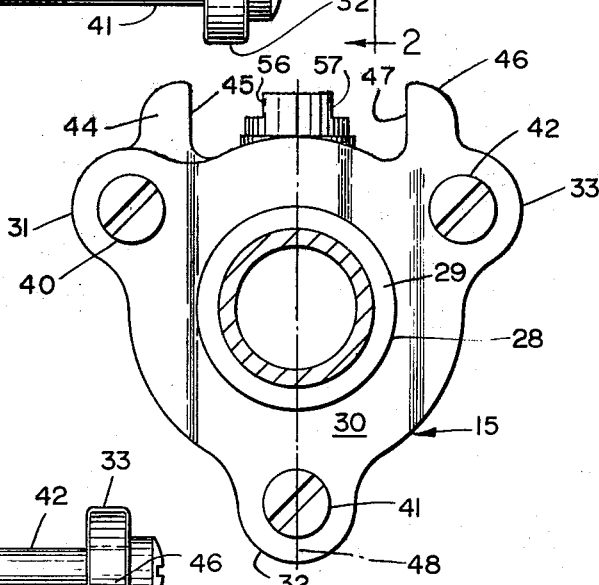
FIG. 2 is an end view, with the handle removed, of the combination of FIG. 1 from line 2—2 of FIG. 1.
Figure 3:
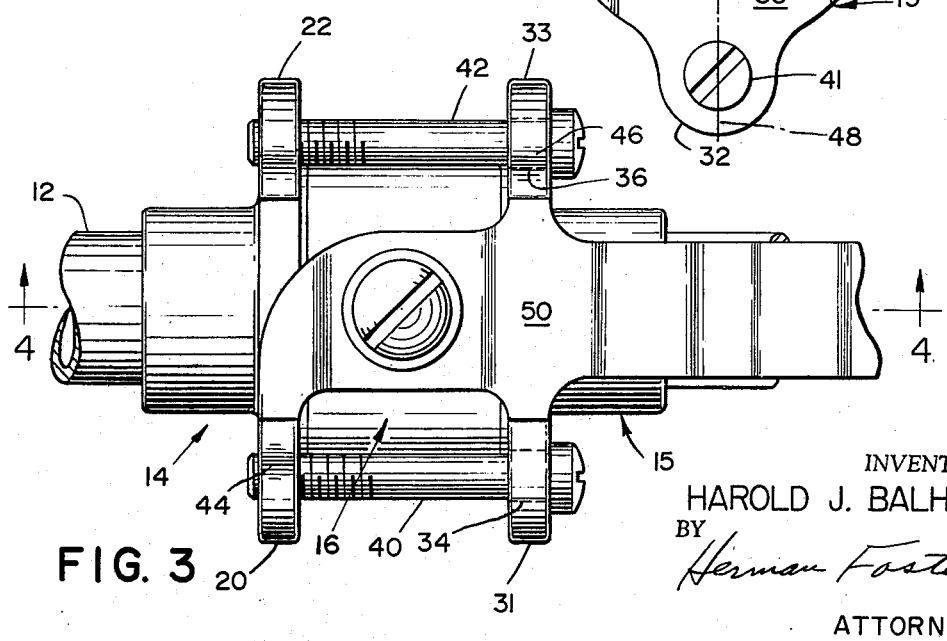
FIG. 3 is a top view of the combination of FIG. 1.
Figure 4:
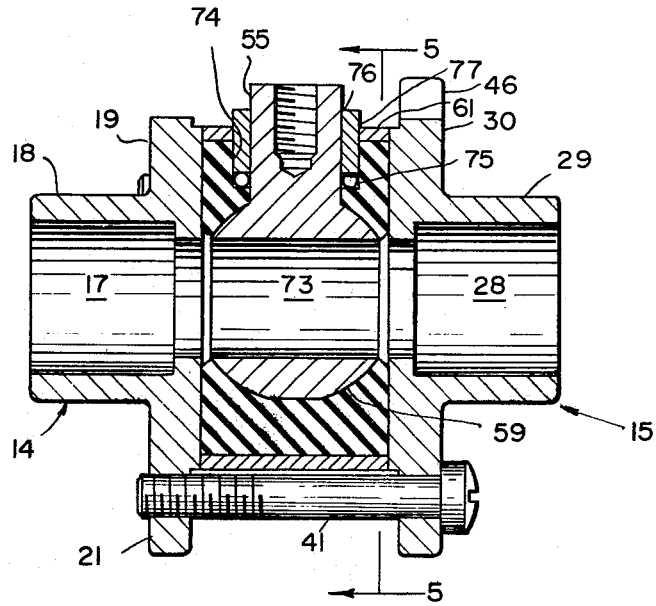
FIG. 4 is a section taken along line 4—4 of FIG. 3.
Figure 5:
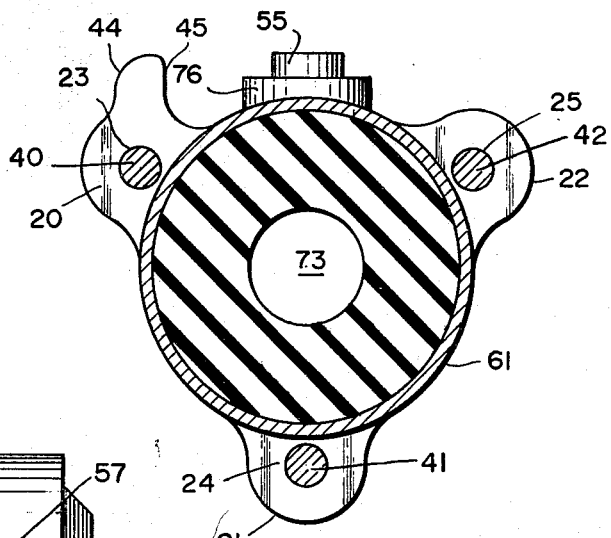
FIG. 5 is a section taken along line 5—5 of FIG. 4.
Figure 8:
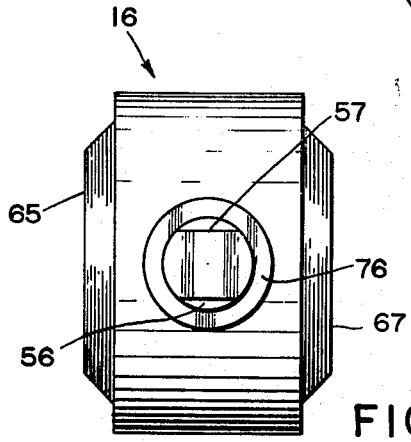
FIG. 8 is a top view of the cartridge of FIG. 6.

Viewing the drawing in greater particularity, FIG. 1 illustrates an entire ball valve combination 11 in place in a pipeline 12. The valve has three major components, two end sections 14 and 15, which are preferably identical in overall construction and a center portion 16. End section 14 (see also FIGS. 4 and 5) has a socket portion 17 formed by a cylindrical wall 18. At the base of the socket portion 17 is a circular flange portion 19 extending at right angles to the axis of the socket portion. Equally spaced about the periphery of the circular flange portion 19 are three outstanding ears 20, 21, 22 integral with the flange portion. These ears, 20, 21, 22 respectively contain threaded holes 23, 24, 25 for receiving body screws 40, 41, 42 respectively.

End section 15 is very similar to end section 14 in that it too has a socket portion, designated in the drawas 28, which is formed by a cylindrical wall 29. At the base of the socket portion 28 is a circular flange portion 30 extending at right angles to the axis of this socket portion. Equally spaced about the periphery of the circular flange portion 30 are three outstanding ears 31, 32, 33 integral with the flange portion. These ears 31, 32, 33 respectively contain holes 34, 35, 36 which, unlike holes 23, 24, 25, are not threaded but are large enough to freely permit the passage of body screws 40, 41, 42 respectively.

Each flange portion 19 and 30 has a projection extending from the flange portion adjacent one ear thereof and lying generally in the plane of the flange portion. Thus, adjacent ear 20 is a projection 44 which has a straight abutment face 45, and, adjacent ear 33, is a projection 46 which has a straight abutment face 47. The projections 44 and 46 are spaced apart axially as a result of being part of the spaced flange portions 19 and 30 respectively. Also the abutment faces 45 and 47 are spaced apart when viewed from one end of the valve structure. These faces are parallel to each other and to an imaginary plane 48 containing the longitudinal axis of the valve and passing between the faces at an equal distance from each face.

The abutment faces 45 and 47 act as limit stops for the handle 50 and restrict handle turning movement to a 90° arc. The handle is mounted on ball spindle 55 by slipping the handle over the spindle so that the spindle 55 extends through opening 51 in the handle. The spindle has two flats 56 and 57 milled on opposite sides of the spindle top which engage corresponding flats which are part of the walls of opening 51 so that torque is transmittable from the handle to the spindle and ball. Fastening of the handle 50 to the spindle 55 is obtained by passing a screw 52 through a washer 53 and threading the screw into threaded hole 54 in the top of spindle 55.

Figure 6:
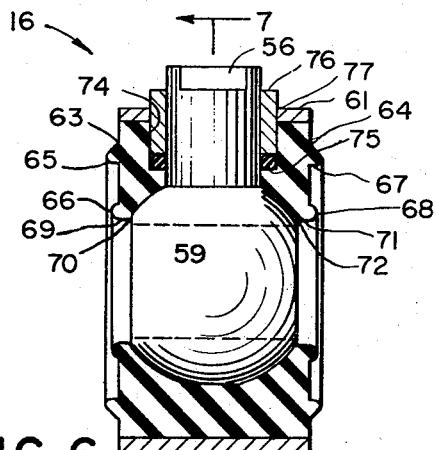
FIG. 6 is a vertical elevation section of the cartridge insert itself.
Figure 7:
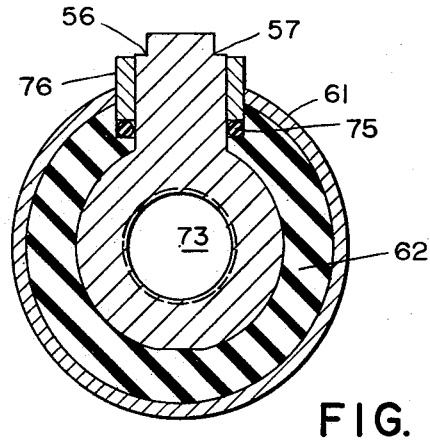
FIG. 7 is a section taken on line 7—7 of FIG. 6.
Figure 9:
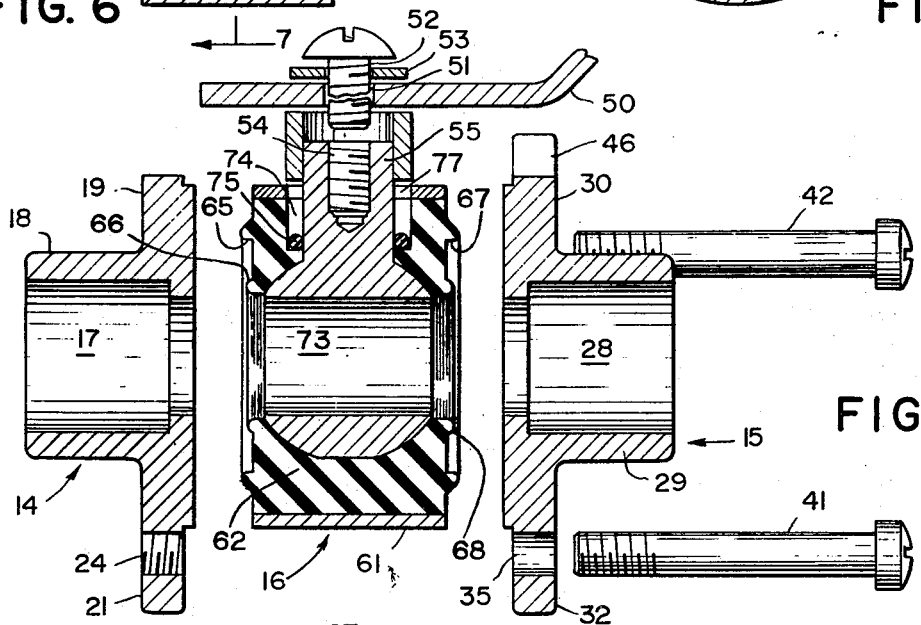
FIG. 9 is an exploded side view, in section, showing the components of the valve combination about to be assembled.

The spindle 55 and ball 59 with which the spindle is integral are the heart of the valve cartridge which is also generally indicated as the center portion 16 (see FIG. 6). This cartridge has a cylindrical metal casing 61. Within the casing is an integral molded mass or core 62 of elastomer such as nitrile rubber. This core is confined at its periphery by the casing 61. At its axially spaced ends 63 and 64 the elastomer core has integrally molded outwardly extending lips. Thus, in the instant case, two concentric lips 65 and 66 having axially outwardly extending apexes are molded integral with end 63 and two concentric lips 67 and 68 are molded integral with end 64. The outer lips 65 and 67 preferably extend axially outwardly a greater distance than their respective adjacent inner lips 66 and 68. The bases of the lips 65 and 66 are preferably approximately contained within a plane containing the casing end at core end 63 and the base of lips 67 and 68 are preferably approximately contained within a plane containing the casing end at core end 64.

The lip 66 has an axially, inwardly directed wall portion 69 which terminates at a circular edge 70 in close abutting relation with the surface of ball 59. Likewise the lip 68 has an axially, inwardly directed wall portion 71 which terminates at a circular edge 72 in close abutting relation with the surface of ball 59. The sealing relation of lips 66 and 68 to the ball 59, when the valve is assembled, is assured by the pressure imposed by flanges 19 and 30 when the body screws 40, 41, 42 are tightened.

The ball 59 is retained centrally of the cylindrical casing 61 solely by the elastomer core 62 and contains an axially oriented cylindrical flow passage or bore 73 through the ball. This flow passage is slightly smaller in diameter than the circles defined by the lip edges 70 and 72 when the ball is in a fully open position. The elastomer core 62 completely surrounds the ball 59 and a portion of the stem 55. A portion of the stem (the upper portion) is not in contact with the elastomer core because the core is spaced an equal distance away from the stem, forming a cylindrical well 74. At the bottom of this well in sealing contact with the stem 55 and core 62 is an elastomer O-ring 75 which is retained in place by a cylindrical sleeve 76. This sleeve is interposed between the core and stem in the well 74 in snug relation to the core and in sliding relation to the stem. Further, the sleeve 76 extends along the stem 55 through a hole 77 in the casing 61 terminating approxiamately at the bottom of flats 56 and 57 in the stem. Preferably, in the assembling of the valve the sleeve is dimensioned so as to extend slightly above the bottom of flats 56 and 57 so that when the handle 50 is screwed to the stem 55 the sleeve will be pushed down onto the O-ring 75, subjecting it to a slight compressive force which deforms it radially thus enhancing its sealing properties.

Figure 10:
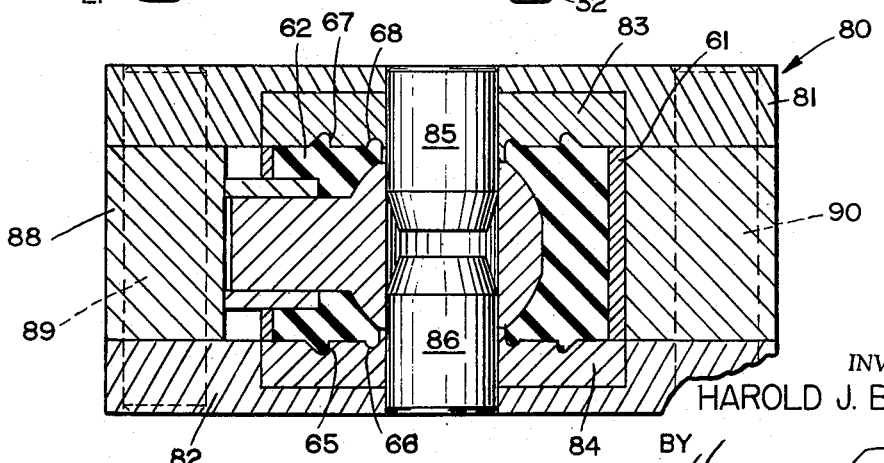
FIG. 10 is a section of a typical compression mold showing a forming procedure of the cartridge insert.

FIG. 10 illustrates one of several preferred means by which the cartridge 16 may be assembled. The embodiment illustrated therein is for a compression mold generally indicated as 80. This mold is constructed in three parts, a top 81, a bottom 82, and a center section 88. Within the mold are top and bottom dies 83 and 84. These dies are shaped to properly compress and form core 62 with its sealing lips 65, 66, 67, 68. To prevent the bore 73 from being filled with material mandrels 85 and 86 are inserted into the bore in a close fit so as to extend from the top die 83 and bottom die 84 respectively. The casing 61 when placed in position inside section 88 and between top and bottom dies 83 and 84 acts as a finished die wall for the periphery of the elastomer core 62.

In preparing the mold for manufacturing of the cartridge the ball 59 is inserted into the cylindrical casing 61 so that the ball spindle 55 extends through hole 77 in the casing. The casing and ball are then placed on the bottom die 84 and mandrel 86 inserted into bore 73 in the ball. Center section 88 is then placed over the casing and ball. The cavity formed by die 84 and casing 61 is then charged with elastomeric material. The top mold 81 and die 83 are then placed properly over the center section 88 by inserting mandrel 85 in bore 73 and properly aligning pins 89 and 90. The charge is then subjected to heat and pressure to mold the core 62. When the core has been completed and cured the mold is opened and the core and casing are removed as an integral cartridge.

The cartridge is assembled into a valve by placing an end section such as 14 adjacent core end 63 so that the abutment projection 44 extends approximately parallel to ball spindle 55. At the other end 64 of the core an end section 15 is placed adjacent the cartridge so that the abutment projection 46 also extends approximately parallel to ball spindle 55 and projection 44. Body screw 40 is then inserted through hole 34 in ear 31 and threaded into threaded hole 23 in ear 20. Likewise, body screw 41 is inserted through hole 35 in ear 32 and threaded into threaded hole 24 in ear 21; and body screw 42 is inserted through hole 36 in ear 33 and threaded into threaded hole 25 in ear 22. All of the screws pass externally of, but in close proximity to, the exterior of casing 61 and are parallel to the axis of the flow passage through the valve. When the body screws are tightened it is seen that the core 62 is protected against overcompression by reason of the axial ends of the casing 61. Since the casing ends are in fixed parallel relation and the bases of circular lip 65, 66, 67 and 68 are approximately in these planes the major compressed portions of the core will be the lips themselves.

With all of the body screws in their tightened retaining positions the ears of the valve end sections will be brought into proper alignment thus also properly aligning the abutment faces 45 and 47 of their respective projections 44 and 46. The O-ring 75 is then inserted into well 74 and sleeve 76 is slipped over the spindle 55 into contact with the O-ring. In this position the handle may be turned 90° between abutment faces to open and close the ball and its bore.

It is easily recognized that the complete valve may readily act as a pipe union because once the ends 14 and 15 have been joined to a pipe, such as 12, all that is required to separate sections of the pipe is to remove body screws 40, 41, 42 and remove the cartridge section 16. Further, because the cartridge is so readily removable and replaceable the valve may be sweated in place in a pipe with the cartridge removed so as to protect the elastomer core against overheating from the pipe fitter's or plumber's torch.

It is to be understood that terms such as "top," "upper," "vertical," etc., are merely terms used to simplify the recitation of the relationship of parts of my invention and are not intended to limit the orientation thereof.

I claim:

1. In a ball stop valve, a removable cartridge insert comprising:
    (a) an axially extending cylindrical walled casing having a hole through one side of the wall of said casing,
    (b) a ball member within said casing and having an axial bore therethrough and integral with a rotatable spindle extending through said hole in said casing,
(c) a molded elastomer core interposed between said ball and said casing and filling said casing from one end to the other, said core including:
  (I) an axial bore portion at each end which approximately meets the bore of said ball in open position
  (II) sealing means at each end extending axially outwardly beyond each corresponding end of said casing
  (III) sealing means adjacent said spindle for sealing said hole in said casing, said sealing means being an elastomer O-ring in a well in said core held in place by a sleeve about said spindle, and in sliding relation to said spindle.

2. In a ball type stop valve,
(a) two opposed spaced end members, each of said end members including:
  (I) an axially oriented socket portion defined by a cylindrically shaped wall,
  (II) a flange portion at and integral with one end of said socket portion and oriented at right angles to said socket portion,
(b) a removable cartridge member interposed between said two flange portions in abutting relation, said cartridge member comprising:
  (I) an axially extending cylindrical metal walled casing having a hole through one side of the wall of said casing,
  (II) a ball member within said casing and having an axial bore therethrough and integral with a rotatable spindle extending through said hole in said casing,
  (III) a molded elastomer core interposed between said ball and said casing and filling said casing from one end to the other, said core including:
    (A) an axial bore portion at each end which approximately meets the bore of said ball in open position,
    (B) sealing means at each end compressed between said core and the abutting flange portion in sealing relation,
    (C) sealing means adjacent said spindle for sealing said hole in said casing, said sealing means comprising an elastomer O-ring held in place by a sleeve about said spindle and extending through said hole and in sliding relation to said spindle,
(c) means for bringing and holding said two flange portions into retaining and sealing relation with said cartridge member.

3. A ball type stop valve as called for in claim 2 wherein said sealing means at each end are at least two circular concentric lips compressed from a normally axially outwardly extending condition, the inner of said lips also being pressed against said ball member to assure a good sealing relation.

4. A ball type stop valve as called for in claim 3 wherein said means for bringing and holding said two flange portions into retaining and sealing relation with said cartridge member include:
  (a) an equal plurality of outstanding ears on the periphery of each flange portion substantially in the plane of their respective flange portion.
    (I) the ears on one of said flange portions each having a threaded hole therethrough, parallel to its socket portion axis,
    (II) the ears on the other of said flange portions each having a hole therethrough parallel to its socket portion axis and larger in diameter than said threaded holes,
  (b) a body screw extending through each of said larger holes and being threaded into a corresponding threaded hole, each of said body screws being parallel to the axis of said valve.

5. A ball type stop valve as called for in claim 4 wherein said sleeve about said spindle is held in place by a handle attached to said spindle above said sleeve.

References Cited
UNITED STATES PATENTS

| | | | |
|---|---|---|---|
| 3,223,111 | 12/1965 | Anderson | 251—171 X |
| 3,244,398 | 4/1966 | Scaramucci | 251—148 |
| 3,356,337 | 12/1967 | Olen | 251—315 |

M. CARY NELSEN, Primary Examiner

WILLIAM R. CLINE, Assistant Examiner

U.S. Cl. X.R.

251—315